C. Lehnert,
Shutter Worker.
No. 80,414. Patented July 28, 1868.
Fig: 1.
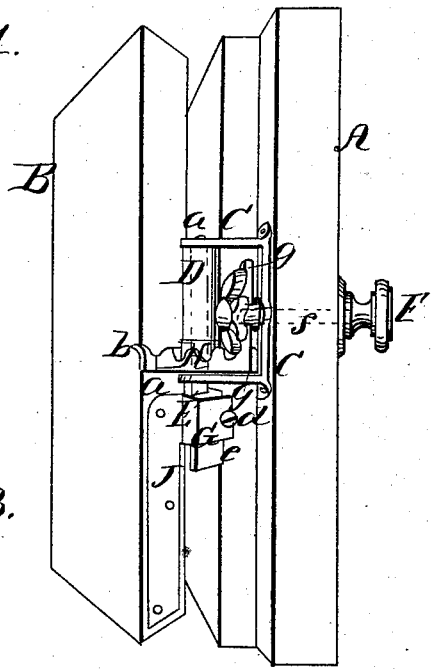
Fig: 2.
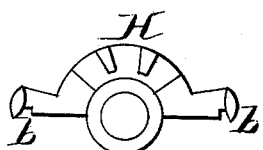
Fig: 3.
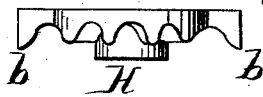
Fig: 4.
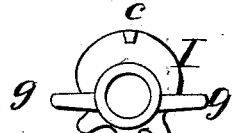
Fig: 5.
Fig: 6.
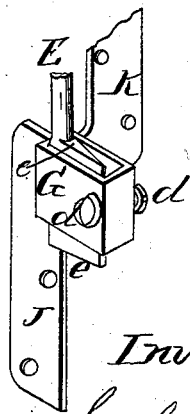
Witnesses:
Wm F. Lett
Edward E. Osborn
Inventor,
Carl Lehnert
By his attorney
C. S. Durgin

United States Patent Office.

CARL LEHNERT, OF BOSTON, MASSACHUSETTS, ASSIGNOR TO JOSEPH M. WEILHART, OF SAME PLACE.

Letters Patent No. 80,414, dated July 28, 1868.

---

IMPROVEMENT IN OPENING AND CLOSING SHUTTERS.

---

The Schedule referred to in these Letters Patent and making part of the same.

---

TO ALL WHOM IT MAY CONCERN:

Be it known that I, CARL LEHNERT, of Boston, in the county of Suffolk, and State of Massachusetts, have invented a new and useful Improvement in Window-Shutter Fastenings; and I do hereby declare the following to be a full, clear, and exact description of the same, reference being had to the drawings accompanying this specification, and forming part of the same, and to the figures and letters of reference thereon.

Figure 1 of the said drawings is a view, in perspective, of a window-shutter, with the fastening applied thereto.

Figures 2 and 3 are views of the segment-gear H.

Figures 4 and 5 are views of the cam-gear I, and

Figure 6 is a view of the adjusting-apparatus.

Similar letters of reference indicate corresponding parts in all the drawings.

My invention is an improvement on a prior invention patented to me on the 26th day of February, 1867, No. 62,493, and consists, first, in a novel arrangement and combination of parts for holding and locking the shutter, whether open or closed; second, in an adjusting-mechanism, whereby the shutters may be readily adjusted perpendicularly, when they do not fit or hang properly.

To enable others skilled in the art to make and use my invention, I will describe the construction and mode of operation of the same.

The frame C is provided with screw-holes, to attach it to the window-casing A, and with journals for the shafts E and $f$. The shaft E passes through the collar D, and has secured to it the segment-gear H, and its lower end is flattened out into the wedge $e$, and is received in the box G, in which it is firmly held, by the screws $d\ d$. The shaft $f$ passes through the window-casing, and the handle F is attached thereto; its end fits in a socket in the collar D. To this shaft the cam-segment I is fastened. The cam-segment I, the shape of which is plainly shown in figs. 4 and 5, is made with three teeth on one side, and with two spurs $g\ g$, which are situated between the teeth and the cam, and with a tooth or projection, $c$, on the opposite side. The segment-gear H is formed with an arm on each side, provided with catches or hooks $b\ b$, and with four teeth, the two end ones of which are formed with inclined surfaces, against which the cam-surface of the segment I works, when the two are in working position. The form of this segment-gear is represented in figs. 2 and 3.

The box G, in which the end $e$ of the shaft E is secured, shown in fig. 6, is provided with two plates J K, at right angles to each other, for the purpose of securing it to the shutter.

The several parts of the apparatus being secured in their proper position in the frame C, and the whole attached, in the manner shown, to the window-casing and the shutter, the operation will be as follows, the window-shutter presumed to be open:

As the handle on the inside of the apartment is turned, the spur $g$, on the segment I, strikes against the arm $b$, and rotates the segment H sufficiently to allow the teeth of both segments to gear, and the motion being continued, the shutter is completely closed. Another turn of the handle being given, the cam of the segment I is brought against the surface of the inclined tooth on the segment H, and the catch $c$ is thrown under the hook $b$, by which means the shutter is held and securely locked in place, so that it cannot be operated upon except from the inside. The movement being reversed, the shutter is thrown open, and locked in the same manner. The blinds or shutters of a window are thus quickly and easily operated from the inside of the room, and without the necessity of raising the window.

By means of the wedge $e$ and screws $d\ d$ in the box G, I am enabled to readily adjust the shutter, without the necessity of removing the hinges, when the same does not hang truly and in line, so that the shutters do not fit or come evenly together.

Having thus fully described my invention, what I claim, and desire to secure by Letters Patent, is—

1. The combination of the cam-surface and catch or projection $c$ on the cam-segment I, with the spurs $b\ b$, on the segment-gear H, for holding the blind or shutter open or closed, substantially as described and specified.

2. The wedge $e$ and adjusting-devices, in combination with the segments H I, and cam-surfaces thereon, substantially as described and specified.

CARL LEHNERT.

Witnesses:
ELLIS L. MOTTE,
JAMES SCHOULER.